(12) United States Patent
Klettke

(10) Patent No.: US 7,316,486 B2
(45) Date of Patent: Jan. 8, 2008

(54) LED LIGHTING ARRANGEMENT

(75) Inventor: Oliver Klettke, Nürnberg (DE)

(73) Assignee: Diehl Luftfahrt Electronik GmbH, Nürnberg (DE)

( * ) Notice: Subject to any disclaimer, the term of this patent is extended or adjusted under 35 U.S.C. 154(b) by 169 days.

(21) Appl. No.: 11/110,070

(22) Filed: Apr. 20, 2005

(65) Prior Publication Data

US 2005/0237754 A1    Oct. 27, 2005

(30) Foreign Application Priority Data

Apr. 24, 2004  (DE)  ..................  10 2004 020 119

(51) Int. Cl.
*F21V 9/00*    (2006.01)

(52) U.S. Cl. ................. 362/231; 362/471; 362/545

(58) Field of Classification Search ............... 362/471, 362/555, 612, 800, 488, 545, 227, 231, 240, 362/252, 230
See application file for complete search history.

(56) References Cited

U.S. PATENT DOCUMENTS

| | | | |
|---|---|---|---|
| 4,737,764 A | 4/1988 | Harrison | |
| 5,436,535 A * | 7/1995 | Yang | .............. 315/313 |
| 5,808,592 A * | 9/1998 | Mizutani et al. | ............. 345/83 |
| 6,200,002 B1 | 3/2001 | Marshall et al. | |
| 6,203,180 B1 | 3/2001 | Fleischmann | ............. 362/471 |
| 6,547,416 B2 | 4/2003 | Pashley et al. | |
| 6,722,771 B1 * | 4/2004 | Stephens | ............. 362/184 |
| 7,012,384 B2 * | 3/2006 | Tatewaki et al. | ............ 315/323 |
| 7,038,398 B1 * | 5/2006 | Lys et al. | ................ 315/291 |
| 2003/0072153 A1 | 4/2003 | Matsui et al. | |
| 2003/0156422 A1 | 8/2003 | Tatewaki et al. | ............ 362/487 |
| 2003/0174499 A1 | 9/2003 | Bohlander | |
| 2003/0193816 A1 | 10/2003 | Rahn | ............. 362/555 |
| 2004/0052076 A1 | 3/2004 | Mueller et al. | |
| 2005/0063194 A1 | 3/2005 | Lys et al. | |

FOREIGN PATENT DOCUMENTS

| | | |
|---|---|---|
| DE | 198 18 402 A1 | 4/1998 |
| DE | 199 01 669 A1 | 1/1999 |

* cited by examiner

*Primary Examiner*—Sandra O'Shea
*Assistant Examiner*—Bao Q. Truong
(74) *Attorney, Agent, or Firm*—Scully, Scott, Murphy & Presser, P.C.

(57) ABSTRACT

A lighting arrangement (1) which is advantageous in particular for the interior lighting of a vehicle or aircraft. The lighting arrangement (1) includes a plurality of light emitting diodes (2a-2e, 3a-3d, 4a-4c) of at least two groups (9, 10, 11), the light emitting diodes being arranged on a surface element (5, 5', 5"), wherein each group (9, 10, 11) includes a light emitting diode or a plurality of light emitting diodes (2a-2e; 3a-3d; 4a-4c) of the same kind and light emitting diodes (2a-2e, 3a-3d, 4a-4c) of different groups (9, 10, 11) are of different kinds. The light emitting diodes (2a-2e, 3a-3d, 4a-4c) are distributed in a two-dimensional geometrical overall pattern (13) on the surface element (5, 5', 5").

14 Claims, 3 Drawing Sheets

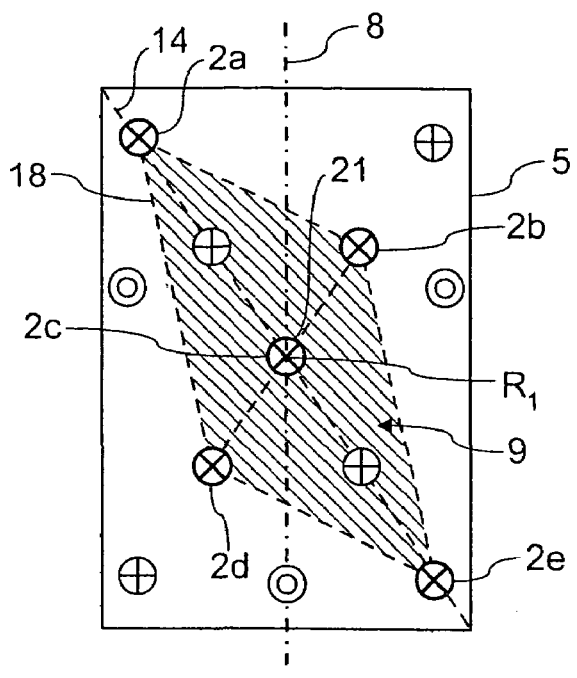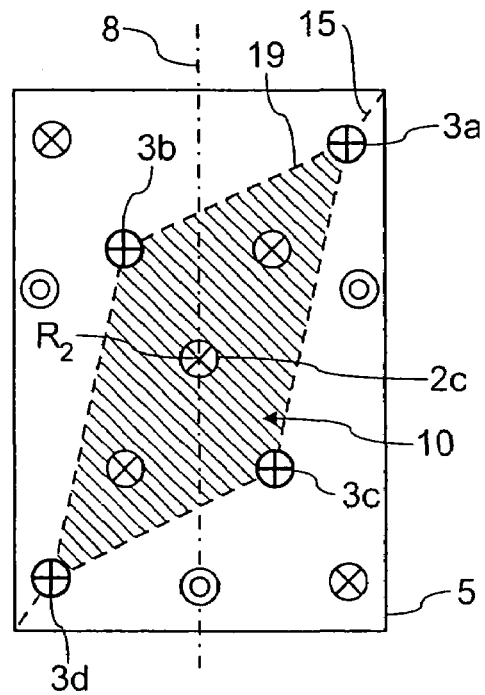
Fig. 2  Fig. 3
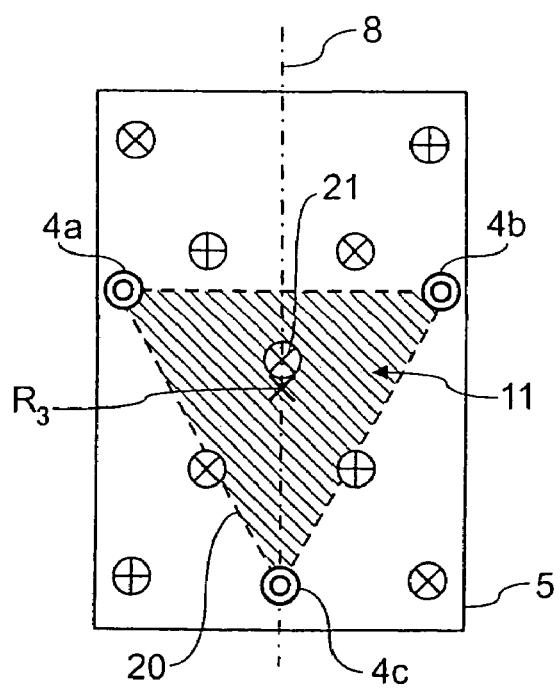
Fig. 4

LED LIGHTING ARRANGEMENT

BACKGROUND OF THE INVENTION

1. Field of the Invention

The invention relates to a lighting arrangement which is provided in particular for the interior lighting in a vehicle or aircraft, in particular in a passenger aircraft.

Hitherto fluorescent lamps have predominantly been used for illuminating the interior of an aircraft. With the exclusive use of fluorescent lamps however it is only very limitedly possible to alter the brightness of the interior lighting or to vary the colour spectrum thereof. That is found to be a disadvantage in many situations. In particular in the design of a modern lighting arrangement in aircraft engineering so-called 'mood lighting' is increasingly used. In that respect use is made of the realisation that the mood and thus the wellbeing of the aircraft passengers, in particular during a long intercontinental flight, can be positively influenced by adapting the interior lighting to the daytime situation. Thus for example interior lighting with a high proportion of blue has a calming effect and can thus promote relaxation of the passengers during a night flight. Equally it can be desirable for the lighting mood to be continuously and slowly varied in order for example to simulate the natural change in light which occurs during a sunrise or sunset.

2. Discussion of the Prior Art

In order to permit a variation of that nature in the lighting situation, light emitting diodes (LEDs) are increasingly used for the interior lighting in an aircraft. In contrast to a fluorescent lamp which is frequently of such a design that it produces white light with a spectral distribution which simulates sunlight, an individual light emitting diode emits light in a comparatively narrow-band spectral range. In order to set a predetermined light colour and in particular to be able to vary that light colour an LED-based lighting arrangement therefore generally uses a combination of light emitting diodes of different colours, for example in the colour combination of red-blue-green. The differently coloured light emitting diodes are actuated in such a way that overall a mixed light of the desired light colour is produced. Conventionally, the individual light emitting diodes of the lighting arrangement are arranged in a succession in a line, the colour of the light emitting diodes changing in a rotational fashion along that arrangement. A problem which frequently occurs in the case of an LED-based lighting arrangement, by virtue of the space conditions which are comparatively limited there, in particular in an aircraft, is that the spacing between the light emitting diodes and the very close wall of the interior to be lit is too small for complete thorough mixing of the light components produced by the individual light emitting diodes to take place over that distance. The consequence of this is that the illuminated wall appears spotty and thus 'restless' to the person viewing it. That effect impairs the action of the interior lighting achieved and is thus undesirable.

A further disadvantage which frequently occurs with a conventional LED-based lighting arrangement is that the light emitting diodes of different colours are loaded to differing degrees, especially as in the case of an average lighting situation the red light component dominates whereas green light occupies only a comparatively small proportion of the overall illumination intensity. The comparatively heavy loading of the in particular red light emitting diodes in turn results in premature wear of that kind of light emitting diode, and thus results in the lighting arrangement having a comparatively short service life.

SUMMARY OF THE INVENTION

The object of the present invention is to provide an LED-based lighting arrangement which permits operation which is rational in particular in terms of a long service life, and which has good illumination properties.

According to the invention that object is attained by the provision of a lighting arrangement, particularly for the interior lighting of a vehicle or an aircraft. In accordance therewith the lighting arrangement includes a plurality of, but including at least three light emitting diodes, wherein each light emitting diode is associated with one of at least two groups. Each group $m=1,2,3,\ldots$ includes a predetermined number of $N_m=1,2,3,\ldots$ light emitting diodes. The term group is defined as meaning that light emitting diodes of the same group (insofar as the group includes more than one light emitting diode) are of a similar kind, for example involve the same color, and that light emitting diodes of different groups are of different kinds. In accordance with the invention the light emitting diodes of the various groups are distributed in a two-dimensional geometrical overall pattern within a surface element.

The underlying notion of the invention is that the individual light emitting diodes of the lighting arrangement are arranged similarly to the atoms of a crystal lattice on a lattice structure which however, in contrast to a crystal lattice, is only two-dimensional. The surface element represents the analogon of the elementary cell of a crystal lattice. Just as the properties of a crystal lattice are completely described by the arrangement of the atoms in its elementary cell, the properties of the lighting arrangement are determined by the arrangement of the light emitting diodes within the surface element. It is essential that this arrangement of the light emitting diodes, in accordance with the invention, is not linear and thus one-dimensional, but is in a two-dimensional overall pattern. The term overall pattern is used to denote a closed areal network structure which is accommodated within the surface element and at the corner points and intersection points of which is arranged a respective light emitting diode.

To form a larger unit of light emitting diodes, any number of surface elements can be fitted together in a tile-like configuration one-dimensionally or two-dimensionally.

It has been found that the areal arrangement of the light emitting diodes of different kinds, in particular of different colours, provides a substantial improvement in the LED lighting arrangement. On the one hand the various groups of light emitting diodes can be dimensioned in respect of their relative number of diodes, in relation to a desired lighting situation, in such a way that on average all light emitting diodes are approximately equally heavily loaded. In that case, as a consequence of the areal arrangement of the light emitting diodes, even with a differing number of light emitting diodes, as between the various groups, it is possible to achieve comparatively homogeneous distribution of the light emitting diodes within the surface element. As a result the average spacing of light emitting diodes of different kinds within the surface element and between a surface element and an adjoining surface element is reduced to a comparatively small dimension, whereby in turn a particularly good light mixing effect is achieved.

For particularly homogeneous light distribution it has proven to be advantageous for the overall pattern to be selected in such a fashion that its centroid lies on a centre line of the surface element. With a number of $M=2,3,4,\ldots$ groups and a number of $N_m=1,2,3,\ldots$ light emitting diodes of the m-th group (m=1,2, . . . , M), the centroid of the overall pattern is given by:

$$R = \frac{\sum_{m=1}^{M}\sum_{n=1}^{N_m} r_{nm}}{\sum_{m=1}^{M} N_m} \quad \text{Equation 1}$$

wherein $r_{nm}=(x_{nm}, y_{nm})$ is the positional vector of the n-th light emitting diode of the m-th group and $R=(X, Y)$ is the positional vector of the centroid. The components $x_{nm}, y_{nm}, X$ and Y of the positional vectors $r_{nm}$ and R respectively are in that case determined by a co-ordinate system which is defined in the surface element and whose zero point is preferably centred with respect to the surface element.

In a preferred embodiment of the invention the light emitting diodes of the same group are also distributed amongst each other in a two-dimensional geometrical group pattern on the surface element, provided that the group has the minimum number of three light emitting diodes, which is required to form a two-dimensional structure. If the group pattern is positioned on the surface element in such a way that its centroid is on a centre line of the surface element, that here again contributes to further homogenising the lighting characteristic. The centroid of the group pattern of the m-th group is given similarly to equation 1 by the following:

$$R_m = \frac{1}{N_m} \cdot \sum_{n=1}^{N_m} r_{nm} \quad \text{Equation 2}$$

wherein $R_m=(X_m, Y_m)$ denotes the positional vector of the group pattern in the above-mentioned co-ordinate system.

Preferably the ratio of the numbers $N_m$ of light emitting diodes of the various groups is so selected that, under average operating conditions for which the lighting arrangement is designed, all light emitting diodes are approximately equally heavily loaded. In this case the number of light emitting diodes of two different groups is in particular selected to be different. In a preferred configuration of the invention there are three groups of light emitting diodes, namely a first group with red light emitting diodes, a second group with blue light emitting diodes and a third group with green light emitting diodes. In that respect, for usual interior lighting, it is advantageous for the first group to have a larger number of light emitting diodes than the second and third groups. A further improvement is achieved if the second group in turn has more light emitting diodes than the third group. To produce white light with a colour temperature of about 4500 K, it has proven to be particularly advantageous for red, blue and green light emitting diodes to be used in a numerical ratio of $N_1:N_2:N_3=5:4:3$. That numerical ratio is desirable in particular having regard to the differing sensitivity of the human eye in relation to the colours red, blue and green and also in regard to the comparatively low light flux of commercially usual blue light emitting diodes.

The form of a surface-centred parallelogram has proven to be a particularly advantageous group pattern for the arrangement of the red light emitting diodes of the first group. In that arrangement four light emitting diodes are disposed at the corners of a parallelogram. A fifth light emitting diode is disposed at the centre of the parallelogram. The arrangement of the four blue light emitting diodes of the second group is desirably effected in a group pattern in the form of a simple parallelogram. That means that a respective light emitting diode is arranged in each corner of a parallelogram. The three green light emitting diodes of the third group are preferably arranged in the form of an isosceles and at least substantially equilateral triangle.

The surface element is in particular selected to be rectangular. In that respect a length-width ratio of between 1.2 and 1.5 has proven to be desirable. Preferably the length-width ratio of the surface element is substantially 1.375.

In a particularly advantageous configuration of the invention, the light emitting diodes of the first and second groups are arranged along the diagonals of the rectangular surface element so that, in the direction of a first diagonal, two light emitting diodes of the second group are arranged alternately between three light emitting diodes of the first group while, along the second diagonal, three light emitting diodes of the first group are arranged between two light emitting diodes of the second group. Desirably in that case the light emitting diodes are arranged on both diagonals substantially in such a way that there is always approximately the same spacing between adjacent light emitting diodes. In addition it has proven to be advantageous for the green light emitting diodes of the third group to be arranged, relative to the light emitting diodes of the first and second groups, in such a way that a green light emitting diode is at substantially the same spacing relative to two respective blue and red light emitting diodes so that the red and blue light emitting diodes are arranged approximately in a segment of a circular arc around the green light emitting diode.

If a group includes more than one light emitting diode, the light emitting diodes of that group are preferably actuated jointly so that, in operation of the lighting arrangement, all light emitting diodes of a group always involve the same brightness and are equally loaded.

To embody a larger unit of light emitting diodes, as is generally required for lighting the whole of an interior space, a plurality of surface elements are arranged in an adjoining row along a common centre line so that the overall pattern of the light emitting diodes of a surface element is repeated periodically similarly to a crystal lattice in each adjoining surface element. In order in particular to homogeneously distribute light emitting diodes which are present only in a comparatively low number, it is provided that the basic pattern of such a group of light emitting diodes is positioned on the surface element in such a way that it is supplemented with the basic pattern of the same group of an adjoining surface element to form a surface-centred rectangular lattice.

BRIEF DESCRIPTION OF THE DRAWINGS

An embodiment of the invention will now be described in greater detail hereinafter by means of a representative illustrative example. In the drawing:

FIG. 2 shows a surface element of the lighting arrangement shown in FIG. 1, in which a first group of light emitting diodes which is arranged in a basic pattern in the form of a surface-centred parallelogram is optically emphasised, FIG. 3 shows the surface element of FIG. 2 in which a second group of light emitting diodes arranged in a group pattern in the form of a simple parallelogram is optically emphasised, FIG. 4 shows the surface element of FIG. 2 in which a third group of light emitting diodes arranged in a group pattern in the form of a substantially equilateral triangle is optically emphasised.

DETAILED DISCUSSION OF THE INVENTION

Figure 1:
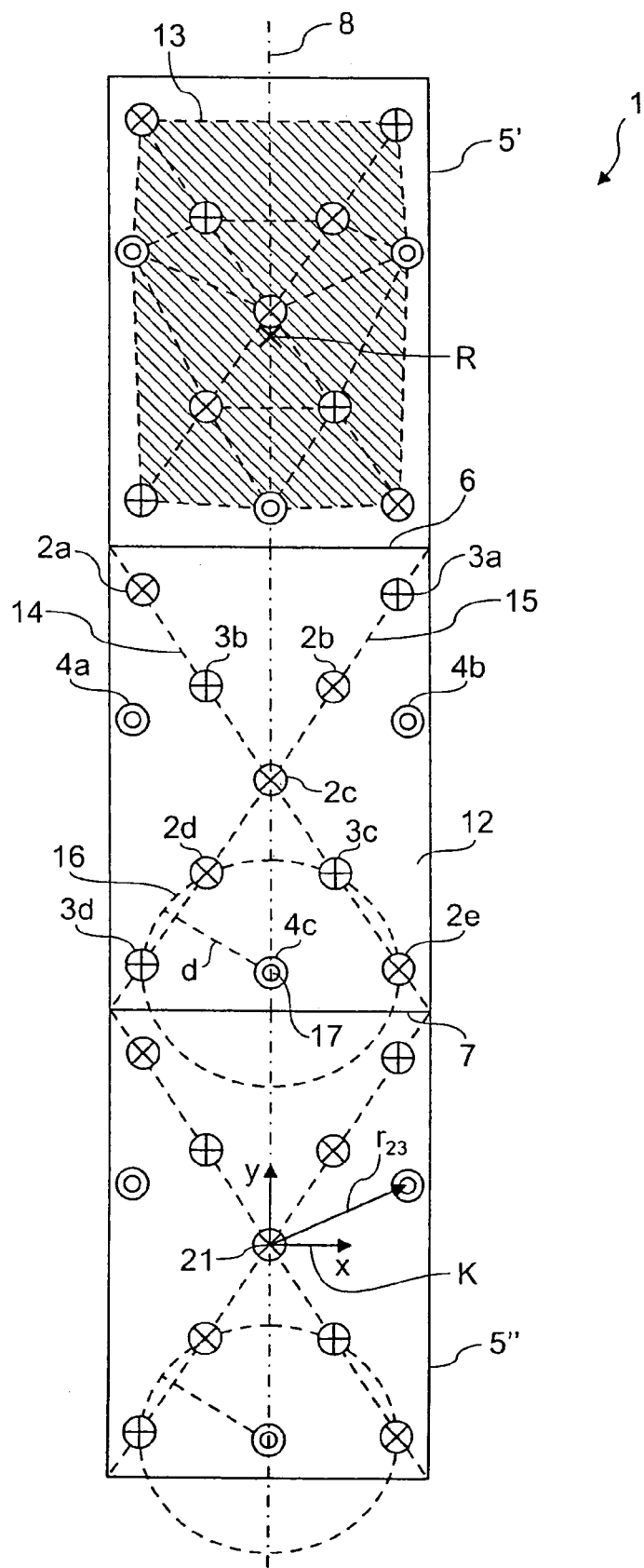
FIG. 1 shows a lighting arrangement with three identical surface elements which are arranged in mutually adjoining aligned relationship, wherein each surface element contains a number of light emitting diodes of three groups, the light emitting diodes being arranged within each surface element in an identical two-dimensional geometrical overall pattern.

The lighting arrangement 1 shown in FIG. 1 includes twelve light emitting diodes 2a-2e, 3a-3d and 4a-4c which are arranged within a rectangular surface element 5 with a length-width ratio of substantially 1.375. Adjoining both narrow sides 6 and 7 of the surface element 5 is a respective further surface element 5' and 5" respectively. The surface elements 5, 5', 5" are fitted together in a tile-like manner and are thus centred in aligned relationship with respect to a common centre line 8. The surface elements 5, 5', 5" are identical. In particular each surface element 5, 5', 5" contains an identical light emitting diode arrangement.

The light emitting diodes 2a-2e, 3a-3d, 4a-4c are associated with three groups in respect of their colour. The five light emitting diodes 2a-2e are red and thus form a first group 9 (optically emphasised in FIG. 2). The four light emitting diodes 3a-3d are blue and form a second group 10 (optically emphasised in FIG. 3). The remaining three light emitting diodes 4a-4c are green and form a third group 11 (optically emphasised in FIG. 4).

The light emitting diodes 2a-2e, 3a-3d and 4a-4c of each surface element 5, 5', 5" are mounted on a common carrier 12, in particular a printed circuit board, and are contacted in such a way that the light emitting diodes 2a-2e, 3a-3d and 4a-4c are respectively actuable jointly in grouped fashion. The size of the carrier 12 in the embodiment illustrated in FIG. 1 corresponds to a single surface element 5, 5', 5". Alternatively however the size of the carrier 12 can also differ from the size of the surface element 5, 5', 5". Thus for example it would be possible to use a carrier which extends over a plurality of surface elements 5, 5', 5". The surface extent of the carrier 12 however can on the other hand be less than the surface element 5, 5', 5".

The light emitting diodes 2a-2e, 3a-3d and 4a-4c are distributed in an areal configuration over the surface element 5, 5', 5" so that their arrangement forms a two-dimensional geometrical overall pattern 13. That overall pattern 13 is optically emphasised in FIG. 1 in the region of the surface element 5' by way of example by broken lines and a surface filled with dotted lines. As can be seen from FIG. 1 the overall pattern 13 is of an axis-symmetrical configuration and is oriented on the surface element 5, 5', 5" in such a way that the centre line 8 forms the axis of symmetry of the overall pattern 13. The centroid R of the overall pattern 13, which can be calculated in accordance with equation 1, is thus on the centre line 8. The positional vectors $r_{nm}$ involved in equation 1 (shown by way of example is the positional vector $r_{23}$ of the second light emitting diode 4b of the third group 11) are defined by the co-ordinate system K of each surface element 5, 5', 5", the co-ordinate system being entered by way of example in the region of the surface element 5".

The light emitting diodes 2a-2e of the first group 9 and the light emitting diodes 3a-3d of the second group 10 are arranged in such a way that they are on the diagonals 14 and 15 of the surface element 5, 5', 5" and are approximately equidistantly distributed on those diagonals 14 and 15. In this respect the group association of the light emitting diodes 2a, 3b, 2c, 3c and 2e arranged on the diagonal 14 changes alternately so that the colour combination red-blue-red-blue-red is afforded along the diagonal 14. Along the diagonal 15 the two blue light emitting diodes 3a and 3d are disposed on respective sides of the three red light emitting diodes 2b, 2c and 2d. As can also be seen from FIG. 1 the green light emitting diode 4c is arranged in relation to the closest blue and red light emitting diodes 2d, 2e, 3c, 3d in such a way that it always occupies substantially the same spacing d in relation thereto, so that the red and blue light emitting diodes 2d, 2e, 3c, 3d lie with an alternate colour change substantially on a circular arc 16 of a radius corresponding to the spacing d, at the centre point 17 of which is disposed the light emitting diode 4c.

The respective optical emphasis in each of FIGS. 2, 3 and 4 makes it clear that the light emitting diodes 2a-2e, 3a-3d, 4a-4c of each group 9 and 10 and 11 respectively, considered in themselves, are again respectively arranged in a two-dimensional geometrical group pattern 18 and 19 and 20 respectively. The group pattern 18 of the first group 9, which is shown in FIG. 2, corresponds to a surface-centred parallelogram which is oriented along the diagonal 14. The group pattern 19 associated with the second group 10 is in the form of a simple parallelogram, that is to say a parallelogram which is occupied by the light emitting diodes 3a-d, only at the corner points. Finally, the group pattern 20 associated with the third group 11 is in the form of an isosceles and substantially equilateral triangle. The respective centroid $R_m$ (m=1,2,3) of the first group 9 and the second group 10 and the third group 11 respectively is also always on the centre line 8. Thus the centroids $R_1$ and $R_2$ of the group patterns 18 and 19 respectively coincide at the centre 21 of the surface element 5, 5', 5" and thus at the location of the light emitting diode 2c. The centroid $R_3$ of the group pattern 20 in contrast is somewhat displaced with respect to the centre 21.

Figure 5:
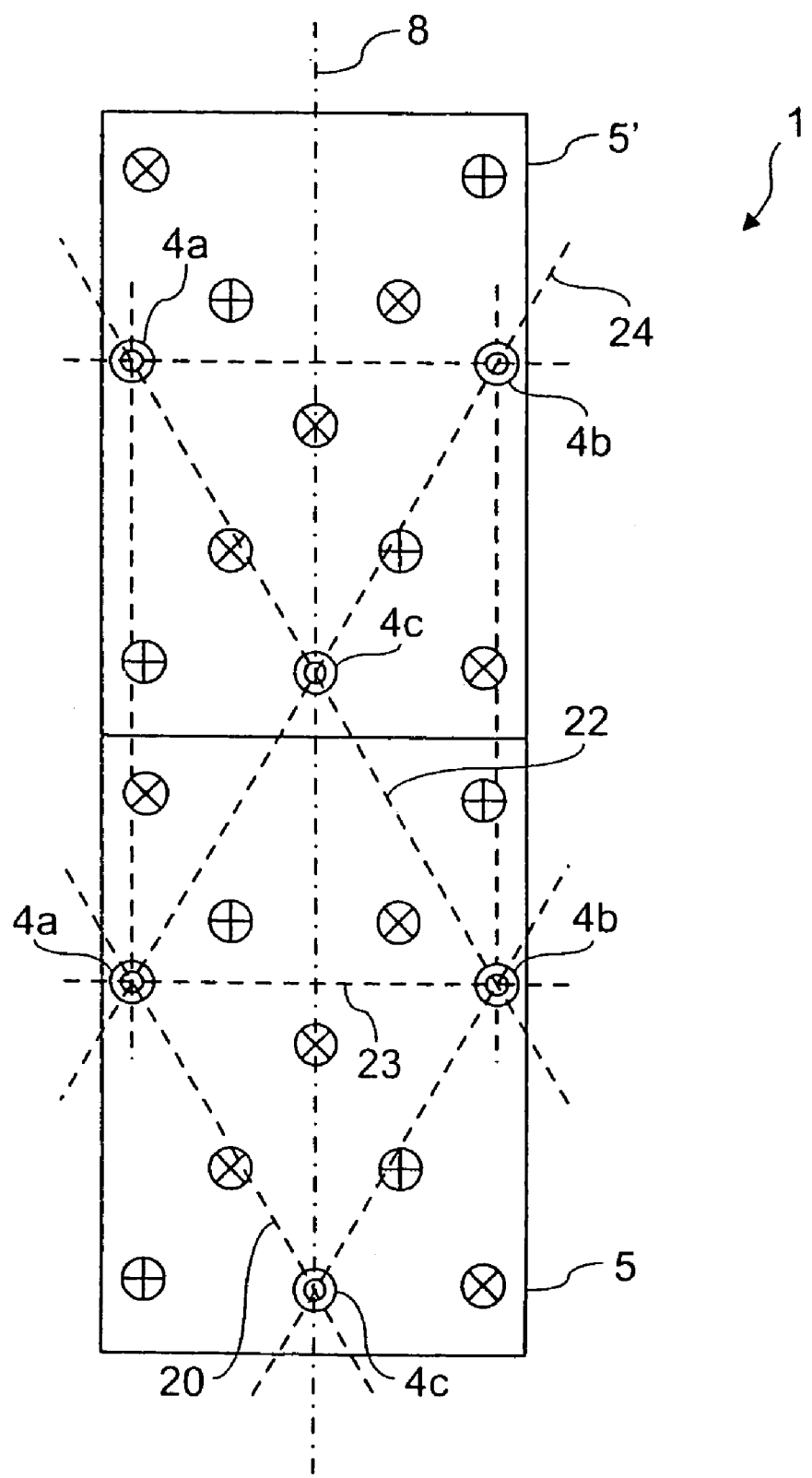
FIG. 5 shows two surface elements of the lighting arrangement shown in FIG. 1, wherein broken lines show that the light emitting diodes of the third group of the adjacent surface elements supplement each other to afford a surface-centred rectangular lattice.

The size of the triangular group pattern 20 is of such a magnitude, with respect to the surface element 5, 5', 5", that the light emitting diodes 4a and 4b of the surface element 5, with the light emitting diode 4c of the adjoining surface element 5', again form a triangular pattern 22 which represents the mirror image, reflected at the connecting line 23, of the group pattern 20. The light emitting diodes 4a-4c of the mutually adjoining surface elements 5, 5', 5" thus form intersection points of a surface-centred rectangular lattice 24 which is indicated by broken lines in FIG. 5.

LIST OF REFERENCES 1 light arrangement
2a-2e light emitting diode
3a-2d light emitting diode
4a-2c light emitting diode
5, 5', 5" surface element
6 narrow side
7 narrow side
8 centre line
9 (first) group
10 (second) group
11 (third) group
12 carrier
13 overall pattern 14 diagonal
15 diagonal
16 circular arc
17 centre point
18 group pattern
19 group pattern
20 group pattern
21 centre
22 pattern
23 connecting line
24 (surface-centred) rectangular lattice
R centroid (of the overall pattern)
$R_m$ centroid (of the group pattern of the m-th group), m=1,2, ...,M
K co-ordinate system
d spacing

The invention claimed is:

1. A lighting arrangement (1), for the interior lighting of a vehicle or aircraft, comprising a plurality of light emitting diodes (2a-2e, 3a-3d, 4a-4c) of at least two groups (9, 10, 11), said light emitting diodes being arranged on a surface element (5, 5', 5"), wherein each group (9, 10, 11) selectively includes at least one light emitting diode or a plurality of light emitting diodes (2a-2e; 3a-3d; 4a-4c) of the same kind, light emitting diodes (2a-2e, 3a-3d, 4a-4c) of different groups (9, 10, 11) being of different kinds, and wherein the light emitting diodes (2a-2e, 3a-3d, 4a-4c) are distributed in an overall two-dimensional geometrical pattern (13) on the surface element (5, 5', 5"); and the centroid (R) of the overall pattern (13) being located on a center line (8) of the surface element (5, 5', 5"), the light emitting diodes (2a-2e, 3a-3d, 4a-4c) of at least one said group (9, 10, 11) with at least three light emitting diodes being arranged distributed in a two-dimensional geometrical group pattern (18, 19, 20) on the surface element (5, 5', 5") such that the centroids ($R_1$; $R_2$; $R_3$) of the respective group patterns (18, 19, 20) are each similarly located on the center line (8) of the surface element (5, 5', 5"); at least two of said group pattern centroids ($R_1$; $R_2$; $R_3$) are located along said center line (8) at separate points so as to avoid coinciding with one another, and wherein at least two of said groups (9, 10, 11) differ in the respectively therewith associated number ($N_m$) of light emitting diodes (2a-2e, 3a-3d, 4a-4c).

2. The lighting arrangement (1) according to claim 1, wherein the light emitting diodes (2a-2e, 3a-3d, 4a-4c) of different groups (9, 10, 11) differ in color, wherein the at least one or each said light emitting diode (2a-2e) of a first group (9) is red, the at least one or each said light emitting diode (3a-3d) of a second group (10) is blue and the at least one or each said light emitting diode (4a-4c) of a third group (11) is green.

3. The lighting arrangement (1) according to claim 2, wherein the light emitting diodes (2a-2e; 3a-3d; 4a-4c) of the same group (9, 10, 11) are actuated in the same manner.

4. The lighting arrangement (1) according to claim 1, wherein a plurality of said surface elements (5, 5', 5") are arranged in a row in adjoining relationship along a common center line (8) so that the overall pattern (13) of the light emitting diodes (2a-2e, 3a-3d, 4a-4c) arranged within each surface element (5, 5', 5") is periodically repeated in at least one spatial direction.

5. The lighting arrangement (1) according to claim 4, wherein the group pattern (20) associated with a group (11) of one said surface element (5, 5', 5") is supplemented with the group pattern (20) of the same group (11) of an adjacent said surface element (5, 5', 5") to provide a surface-centered rectangular lattice (24).

6. A lighting arrangement (1), for the interior lighting of a vehicle or aircraft, comprising a plurality of light emitting diodes (2a-2e, 3a-3d, 4a-4c) of at least two groups (9, 10, 11), said light emitting diodes being arranged on a surface element (5, 5', 5"), wherein each group (9, 10, 11) selectively includes at least one light emitting diode or a plurality of light emitting diodes (2a-2e; 3a-3d; 4a-4c) of the same kind, light emitting diodes (2a-2e, 3a-3d, 4a-4c) of different groups (9, 10, 11) being of different kinds, and wherein the light emitting diodes (2a-2e, 3a-3d, 4a-4c) are distributed in an overall two-dimensional geometrical pattern (13) on the surface element (5, 5', 5"); and the centroid (R) of the overall pattern (13) being located on a center line (8) of the surface element (5, 5', 5"), the light emitting diodes (2a-2e, 3a-3d, 4a-4c) of at least one said group (9, 10, 11) with at least three light emitting diodes being arranged distributed in a two-dimensional geometrical group pattern (18, 19, 20) on the surface element (5, 5', 5") such that the centroids ($R_1$; $R_2$; $R_3$) of the respective group patterns (18, 19, 20) are each similarly located on the center line (8) of the surface element (5, 5', 5"); at least two of said group pattern centroids ($R_1$; $R_2$; $R_3$) are located along said center line (8) at separate points so as to avoid coinciding with one another, wherein at least two of said groups (9, 10, 11) differ in the respectively therewith associated number ($N_m$) of light emitting diodes (2a-2e, 3a-3d, 4a-4c), wherein the respective number ($N_m$) of light emitting diodes (2a-2e; 3a-3d; 4a-4c), which is respectively associated with the first group (9), the second group (10) and the third group (11) is in a ratio of 5:4:3.

7. The lighting arrangement (1) according to claim 6, wherein the light emitting diodes (2a-2e) of the first group (9) are arranged in a group pattern (18) in the form of a surface-centered parallelogram.

8. The lighting arrangement (1) according to claim 6, wherein the light emitting diodes (3a-3e) of the second group (10) are arranged in a group pattern (19) in the form of a simple parallelogram.

9. The lighting arrangement (1) according to claim 6, wherein the light emitting diodes (4a-4e) of the third group (11) are arranged in a group pattern (20) in the form of an equilateral triangle.

10. A lighting arrangement (1), for the interior lighting of a vehicle or aircraft, comprising a plurality of light emitting diodes (2a-2e, 3a-3d, 4a-4c) of at least two groups (9, 10, 11), said light emitting diodes being arranged on a surface element (5, 5', 5"), wherein each group (9, 10, 11) selectively includes at least one light emitting diode or a plurality of light emitting diodes (2a-2e; 3a-3d; 4a-4c) of the same kind, light emitting diodes (2a-2e, 3a-3d, 4a-4c) of different groups (9, 10, 11) being of different kinds, and wherein the light emitting diodes (2a-2e, 3a-3d, 4a-4c) are distributed in an overall two-dimensional geometrical pattern (13) on the surface element (5, 5', 5"); and the centroid (R) of the overall pattern (13) being located on a center line (8) of the surface element (5, 5', 5"), the light emitting diodes (2a-2e, 3a-3d, 4a-4c) of at least one said group (9, 10, 11) with at least three light emitting diodes being arranged distributed in a two-dimensional geometrical group pattern (18, 19, 20) on the surface element (5, 5', 5") such that the centroids ($R_1$; $R_2$; $R_3$) of the respective group patterns (18, 19, 20) are each similarly located on the center line (8) of the surface element (5, 5', 5"); at least two of said group pattern centroids ($R_1$; $R_2$; $R_3$) are located along said center line (8) at separate points so as to avoid coinciding with one another; wherein at least two of said groups (9, 10, 11) differ in the respectively therewith associated number ($N_m$) of light emitting diodes (2a-2e, 3a-3d, 4a-4c), the surface element (5, 5', 5") being rectangular, wherein the light emitting diodes (2a-2e, 3a-3d) of the first and second group (9, 10) are arranged along first and second diagonals (14, 15) of the surface element (5, 5', 5"), wherein along the first said diagonal (14), two light emitting diodes (3b, 3c) of the second group (10) are respectively arranged between light emitting diodes (2a, 2c, 2e) of the first group (9) and wherein along the second diagonal (15), three light emitting diodes (2b, 2c, 2d) of the first group (9) are arranged between light emitting diodes (3a, 3d) of the second group (10).

11. The lighting arrangement (1) according to claim 10, wherein the surface element (5, 5', 5") has a length-width ratio of between 1.2 and 1.5.

12. The lighting arrangement (1) according to claim 11, wherein the surface element (5, 5', 5") has a length-width ratio of substantially 1.375.

13. The lighting arrangement (1) according to claim 10, wherein the light emitting diodes (2a, 2c, 2e, 3b, 3c) are equidistantly arranged on the first diagonal (14) and at least further of the light emitting diodes (2b, 2c, 2d, 3a, 3d) are equidistantly arranged on the second diagonal (15) in said surface element.

14. A lighting arrangement (1), for the interior lighting of a vehicle or aircraft, comprising a plurality of light emitting diodes (2a-2e, 3a-3d, 4a-4c) of at least two groups (9, 10, 11), said light emitting diodes being arranged on a surface element (5, 5', 5"), wherein each group (9, 10, 11) selectively includes at least one light emitting diode or a plurality of light emitting diodes (2a-2e; 3a-3d; 4a-4c) of the same kind, light emitting diodes (2a-2e, 3a-3d, 4a-4c) of different groups (9, 10, 11) being of different kinds, and wherein the light emitting diodes (2a-2e, 3a-3d, 4a-4c) are distributed in an overall two-dimensional geometrical pattern (13) on the surface element (5, 5', 5"); and the centroid (R) of the overall pattern (13) being located on a center line (8) of the surface element (5, 5', 5"), the light emitting diodes (2a-2e, 3a-3d, 4a-4c) of at least one said group (9, 10, 11) with at least three light emitting diodes being arranged distributed in a two-dimensional geometrical group pattern (18, 19, 20) on the surface element (5, 5', 5") such that the centroids ($R_1$; $R_2$; $R_3$) of the respective group patterns (18, 19, 20) are each similarly located on the center line (8) of the surface element (5, 5', 5"); at least two of said group pattern centroids ($R_1$; $R_2$; $R_3$) are located along said center line (8) at separate points so as to avoid coinciding with one another, wherein at least two of said groups (9, 10, 11) differ in the respectively therewith associated number ($N_m$) of light emitting diodes (2a-2e, 3a-3d, 4a-4c), wherein a light emitting diode (4c) of the third group (11) is arranged on the center line (8) of the surface element (5, 5', 5"), and said light emitting diode (4c) is at an equal spacing (d) relative to two light emitting diodes (2d, 2e) of the first group (9) and two light emitting diodes (3c, 3d) of the second group (10).

* * * * *